United States Patent [19]

Kinner

[11] Patent Number: 5,392,196
[45] Date of Patent: Feb. 21, 1995

[54] ELECTRICAL INSTALLATION DEVICE FOR FASTENING TO A CARRIER RAIL

[75] Inventor: Josep Kinner, Burgthann, Germany
[73] Assignee: Ellenberger & Poensgen GmbH, Altdorf, Germany
[21] Appl. No.: 162,945
[22] Filed: Dec. 8, 1993
[30] Foreign Application Priority Data Dec. 17, 1992 [DE] Germany .................. 9217260[U]

[51] Int. Cl.⁶ .............................................. H05K 7/02
[52] U.S. Cl. ..................................... 361/809; 361/752; 361/796; 361/802; 174/17 R
[58] Field of Search ............... 361/752, 741, 756, 796, 361/802, 810, 823, 809; 174/17 R; 439/64

[56] References Cited

FOREIGN PATENT DOCUMENTS

| | | |
|---|---|---|
| 3336256A1 | 4/1984 | Germany . |
| 8626971.2 | 1/1987 | Germany . |
| 3644171A1 | 7/1988 | Germany . |
| 3802074A1 | 12/1988 | Germany . |
| 3728907 | 3/1989 | Germany . |
| 3728907A1 | 3/1989 | Germany . |
| 3929721 | 3/1991 | Germany . |
| 3929721A1 | 3/1991 | Germany . |

Primary Examiner—Gerald P. Tolin
Assistant Examiner—Young Whang
Attorney, Agent, or Firm—Spencer, Frank & Schneider

[57] ABSTRACT

An electrical installation device for fastening in an attachment position on a carrier rail includes an instrument housing made of insulating plastic and having an instrument housing wall and a bottom facing the carrier rail in an attachment position. A sliding latch is shaped in one piece to the instrument housing wall and is movable in a locking direction outside of the housing bottom transversely to the attachment direction and to the carrier rail direction. A flexible web, spring elastic in the locking direction, is connected between the sliding latch and the instrument housing wall. A detent lug is attached to the sliding latch and, in the locking direction, grips behind the carrier rail. An actuating end is connected to the flexible web and faces away from the detent lug, whereby the sliding latch is returnable against the spring elasticity of the flexible web from a locked position into a release position by actuation of the actuating end. A longitudinal guide is attached to the instrument housing wall, wherein the sliding latch is guided in the longitudinal guide between the detent lug and the flexible web.

15 Claims, 4 Drawing Sheets

ELECTRICAL INSTALLATION DEVICE FOR FASTENING TO A CARRIER RAIL

BACKGROUND OF THE INVENTION

The present invention relates to an electrical installation device, for example a low voltage switch, which is configured for fastening in an attachment position on a carrier rail, the device including a sliding latch that is shaped in one piece to an instrument housing wall made of an insulating plastic, and wherein the sliding latch is (a) movable in a locking direction outside of the housing bottom transversely to an attachment direction and to the carrier rail direction;

(b) pivotally connected with a housing wall by way of a flexible web that is spring elastic in the locking direction;

(c) equipped with a detent lug which, in the locking direction, grips behind the carrier rail; and (d) returnable against the spring elasticity of the flexible web from its locked position into a release position by way of an actuating end facing away from the detent lug.

The known installation device is thus fastened to the carrier rail by means of its instrument housing. For this purpose the instrument housing is usually provided with two fastening elements. One fastening element is essentially rigidly shaped to an instrument housing wall and, when the housing bottom is placed onto the carrier rail, clamps one longitudinal edge of the rail between itself and the housing bottom. The second longitudinal rail edge which extends parallel to the first longitudinal rail edge, once the installation device is attached, is clamped in between the housing bottom and a movable sliding latch. The sliding latch is then in its locked position. It is movable in a locking direction between its locked position and its release position. Due to the mobility of the sliding latch, the instrument housing is fastened to a carrier rail, during the attachment process, in the manner of a snap fastening. To release the fastening, the sliding latch is pushed into its release position.

Such an installation device is disclosed, for example, in German Patent No. 3,728,907.A1. The sliding latch disclosed there is shaped in one piece and movably connected to the instrument housing by means of a flexible web that extends perpendicularly to the plane of the carrier rail. At its end facing away from the detent lug that serves to fix it to the longitudinal edge of the rail, the flexible web is extended in the locking direction by way of an actuation end. An actuation tool, for example, a screwdriver blade, engages in the actuation end to move the sliding latch from its locked position into its release position. The movement of the actuating end is here guided by a slotted guide that is shaped in one piece to the shell body and in which the actuation end rests.

A drawback of the prior art installation device is the arrangement and configuration of the sliding latch. The sliding latch constitutes an extension of the moving end of the flexible web. In order for the sliding latch to produce a mechanically stable fixation of the instrument housing on the carrier rail, the flexible web must be made relatively rigid in spite of the elasticity required of it so that the sliding latch remains reliably in its locked position and is able to exert a sufficiently strong pressure force on the carrier rail. The mechanically stable and relatively rigid configuration of the flexible web, however, requires greater exertion of force by the user to move the sliding latch from its locked position into its release position, while a more elastic configuration of the flexible web results in reduced pressure forces on the part of the sliding latch acting on the carrier rail. A stable attachment of the instrument housing on the carrier rail is therefore not ensured. This safety risk is additionally augmented in that the sliding latch, due to natural wear of the flexible web during the bending processes, is removed farther and farther from its original locked position and, in the course of the service life of the flexible web, the sliding latch, as a component that is carried only by the flexible web itself, permanently exerts lower pressure forces on the carrier rail.

SUMMARY OF THE INVENTION

Based on the above noted drawbacks, it is an object of the present invention to improve the mechanical stability of the fastening of the instrument housing and to permit a more user friendly release of the fastening.

The above and other objects are accomplished in accordance with the invention by the provision of an electrical installation device for fastening in an attachment position on a carrier rail, the longitudinal extent of the carrier rail defining a carrier rail direction, with the device being moved in an attachment direction toward the carrier rail during fastening, the device including: an instrument housing made of insulating plastic and having an instrument housing wall and a bottom facing the carrier rail in the attachment position; a sliding latch shaped in one piece to the instrument housing wall and being movable in a locking direction outside of the housing bottom transversely to the attachment direction and to the carrier rail direction; a flexible web being spring elastic in the locking direction and connected between the sliding latch and the instrument housing wall; a detent lug attached to the sliding latch and, in the locking direction, gripping behind the carrier rail; an actuating end connected to the flexible web and facing away from the detent lug, whereby the sliding latch is returnable against a spring elasticity of the flexible web from a locked position into a release position by actuation of the actuating end; and a longitudinal guide attached to the instrument housing wall, wherein the sliding latch is guided in the longitudinal guide between the detent lug and the flexible web.

The sliding latch thus rests, in accordance with the invention, in a longitudinal guide so that the latter carries it. In this way, the longitudinal guide takes over the force component for fixing the detent lug to the carrier rail. Without external force applied to the actuating end, the sliding latch therefore remains reliably in its locked position. Moreover, the force exerted by the sliding latch on the carrier rail is independent of the material characteristics of the flexible web. It is therefore only necessary to consider a sufficient elasticity for the flexible web to be able to effect the displacement movement of the sliding latch with little force.

The longitudinal guide is affected neither by bending stresses nor by other extraneous forces. Thus, the sliding latch is subjected to a holding force that remains constant over the service life of the installation device. Moreover, the required fastening effect of the sliding latch is not adversely affected by the natural wear of the flexible web as a result of a multitude of fastening and release processes. This ensures the mechanically stable fixation of the installation device on the carrier rail. Extraneous forces acting inadvertently on the instrument housing are compensated with a constant effect over the entire operating life. This again improves the operational reliability of the installation device.

The longitudinal guide results in a purely translatory movement of the sliding latch. Compared to a rotational movement, the translatory movement results in a shorter effective displacement path for the sliding latch during its transfer from the locked position into the release position. This simplifies operation of the actuating end.

The translatory movement of the sliding latch inevitably caused by the longitudinal guide prevents the flexible web and the sliding latch connected with it to be pivoted in the manner of a pendulum. Since the flexible web cannot be extended artificially, the translatory movement of the sliding latch constitutes, on the one hand, a strong limitation of the displacement path of the sliding latch in the sense of greater user friendliness and, on the other hand, an improved resetting effect on the part of the flexible web with respect to the sliding latch so that the mechanically stable fastening of the instrument housing on the carrier rail is further improved.

According to another feature of the invention the detent lug is rigidly connected with the sliding latch which ensures the mechanical stability between detent lug and sliding latch so that the effect of the longitudinal guide on the sliding latch is also transferred to the detent lug.

Further in accordance with the invention, there is provided a flexible connection between sliding latch and flexible web which permits pivoting of the flexible web with the expenditure of little force. In contrast to a rigid connection, the flexible connection avoids possible breaks due to very high bending stresses during the displacement movement of the sliding latch. The service life of these components is therefore extended.

In a preferred embodiment of the invention the flexible connection between sliding latch and flexible web is accomplished by a connecting web having a weakened wall thickness section which presents a desired bending location. The connecting web ensures the necessary mechanical stability between the sliding latch and the flexible web for effective force transmission during the displacement movements. The desired bending location permits a translatory movement of the sliding latch in a technically simple manner even if an actuating tool is employed to pivot the flexible web on a circular path similarly to a pendulum.

According to yet another feature of the invention the connecting web extends approximately in the locking direction of the sliding latch and forms an obtuse angle with the flexible web. This arrangement of connecting web and flexible web permits the exertion of a greater force component by the flexible web on the sliding latch and consequently a greater pressure force by the detent lug on the carrier rail. Moreover, the increased force component results in an effective compensation of inadvertent forces that act on the sliding latch to move it out of its locked position so that it reliably remains in its locked position.

According to further features of the invention, the flexible web and actuating end are configured so that it is possible to bring an actuating tool into user friendly engagement in the actuating end in order to displace the sliding latch with little force. Due to an obtuse angle between the housing side wall and the flexible web, the actuating tool can be supported at the housing side wall during its engagement in the actuating end. The housing side wall constitutes an abutment for the actuating tool so that the latter can be pivoted with little force and a very effective force transmission to the sliding latch. At the same time, this housing side wall performs the further function of a limiting abutment for the pivoting of the actuating tool. This avoids excessive bending stresses on the flexible web.

According to still further features of the invention, the longitudinal guide is constructed of two shells. It encloses the periphery of the sliding latch on both sides and thus ensures that the sliding latch is moved in a translatory fashion only in the locking direction. Lateral actions of force transversely to the locking direction therefore do not adversely affect the required displacement movements of the sliding latch. Since the sliding latch is mechanically connected with the flexible web and the actuating end, the latter two components are also better protected against the action of lateral forces so that the mechanically stable arrangement of the flexible web and of the actuating end at the instrument housing remains in effect during the entire operating period.

According to another feature of the invention, the guide shells preferably enclose the sliding latch in a form-locking manner so as to additionally improve the guidance of its movements and to effectively protect the sliding latch against extraneous mechanical damage.

According to another feature of the invention the longitudinal guide has a delimiting face for limiting the translatory movement of the sliding latch in the direction opposite to its locked position. This also contributes to the protection of the flexible web against excessive bending stresses.

Further features of the invention relate to a simplified manufacture and assembly of the instrument housing wherein the instrument housing is divided into half shells. The elasticity of the flexible web and of the connecting web makes it possible for the sliding latch halves and their associated guide shells to be manufactured so that they lie approximately in the same plane without the sliding latch already lying within the guide shells. The coplanar manufacture supports a narrow configuration of the instrument housing. Due to the elasticity of the flexible web and of the adjacent connecting web, the sliding latch halves can be inserted easily, after the manufacture of the housing shells, into the respectively associated guide shell by bending the sliding latch halves outwardly to the sides.

According another feature of the invention, the sliding latch, connecting web and flexible web form a unit which is divided in half to form partial units that are fastened together during assembly by a fixing means which ensures that the partial units, after the instrument housing has been assembled, are stationarily fixed to one another over the entire service life of the instrument housing and perform their functions jointly. Due to their one-piece shaping to the housing shell halves, the partial units which, in the assembled state of the instrument housing, are fixed to one another in a stationary manner, also result in improved fixation of the two housing shell halves to one another so that the mechanical stability of the instrument housing is further improved.

Assembly of the device is further simplified in that the partial units can be fixed, during their assembly to form a unit, without additional working steps since the two housing shell halves are pushed toward one another in any case in the carrier rail direction during assembly of the instrument housing. To accomplish this, the corresponding, mutually facing fixing means, when seen in the carrier rail direction, engage in one another.

Preferred embodiments of the fixing means, described hereinafter, contribute to improve a mechanically stable mutual contact of the partial units during assembly of the instrument housing.

BRIEF DESCRIPTION OF THE DRAWINGS

The present invention will now be described in greater detail with reference to embodiments thereof that are illustrated in the drawings.

DETAILED DESCRIPTION OF THE PREFERRED EMBODIMENT

Figure 1:
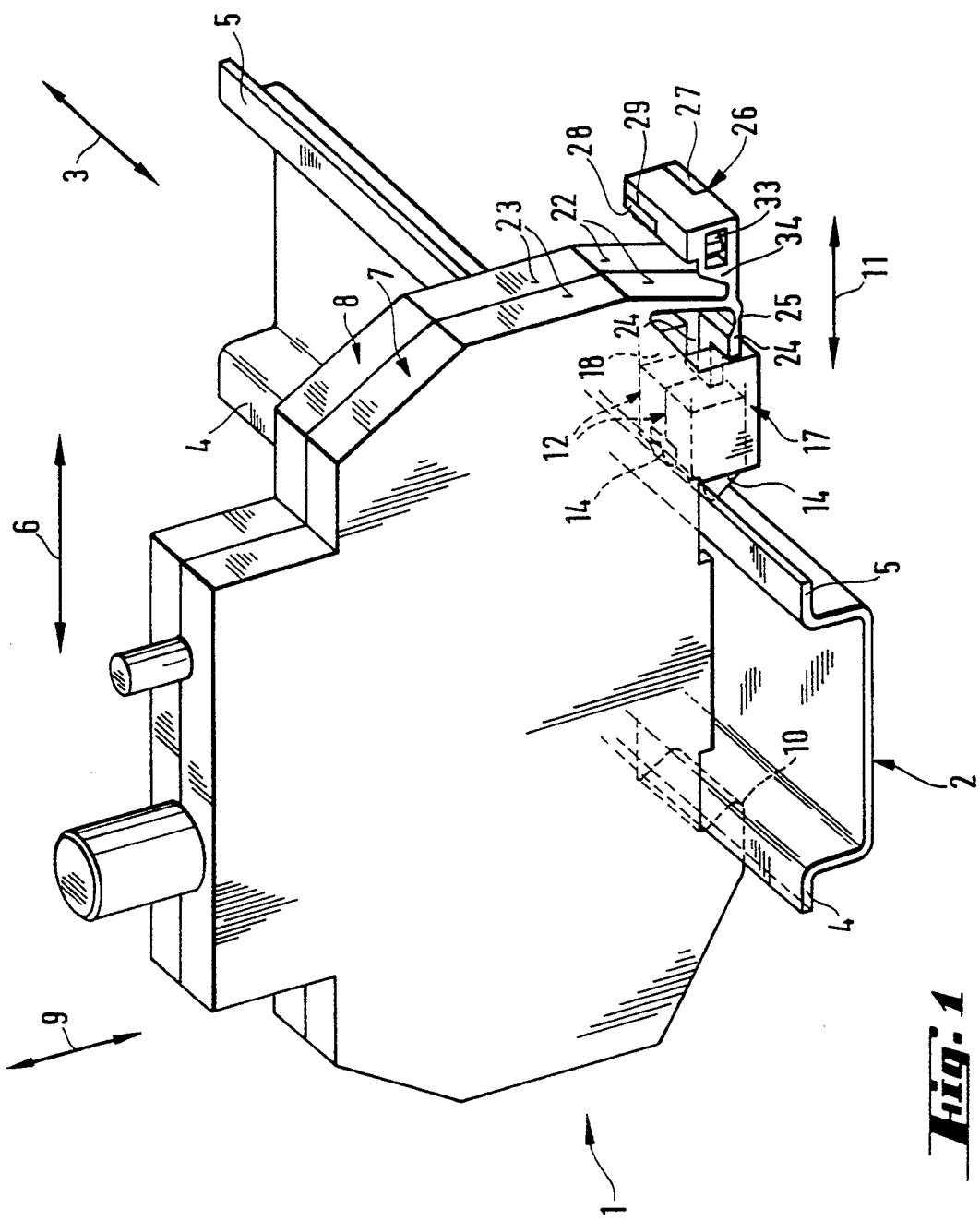
FIG. 1 is a perspective view of an electrical installation device fastened to a carrier rail.

Referring to FIG. 1, there is shown an electrical installation device 1 in an attachment position in which it is placed onto a carrier rail 2. In this embodiment, the installation device 1 is configured as a low voltage circuit breaker switch. The longitudinal extent of carrier rail 2 is oriented in carrier rail direction 3. Seen in carrier rail direction 3, carrier rail 2 has a C-shaped profile. Carrier rail 2 has mutually parallel rail angles 4 and 5, which are oriented in carrier rail direction 3, are bent about 90° relative to the C ends of carrier rail 2 and lie in a plane defined by carrier rail direction 3 and a rail transverse direction 6.

The instrument housing is made of insulating plastic for accommodating the mechanical, electromechanical and/or electronic components of installation device 1 and is composed of two housing shell halves 7 and 8 whose outer contours are essentially identical. The mutually contacting side walls of the two housing shell halves 7 and 8 may have projections or grooves, respectively, which are not shown here, so as to permit mutual fixation of the two housing shell halves 7 and 8 during assembly of the instrument housing. By means of bores (also not shown here) which pass through housing shell halves 7 and 8 in carrier rail direction 3, the two housing shell halves 7 and 8 can be mechanically stably connected with one another, for example by means of plastic screws. The approximately central parting plane of the instrument housing is defined by the transverse direction 6 of the rail and an attachment direction 9 perpendicular thereto. Additionally, the parting plane is oriented perpendicular to carrier rail direction 3.

Figure 2:
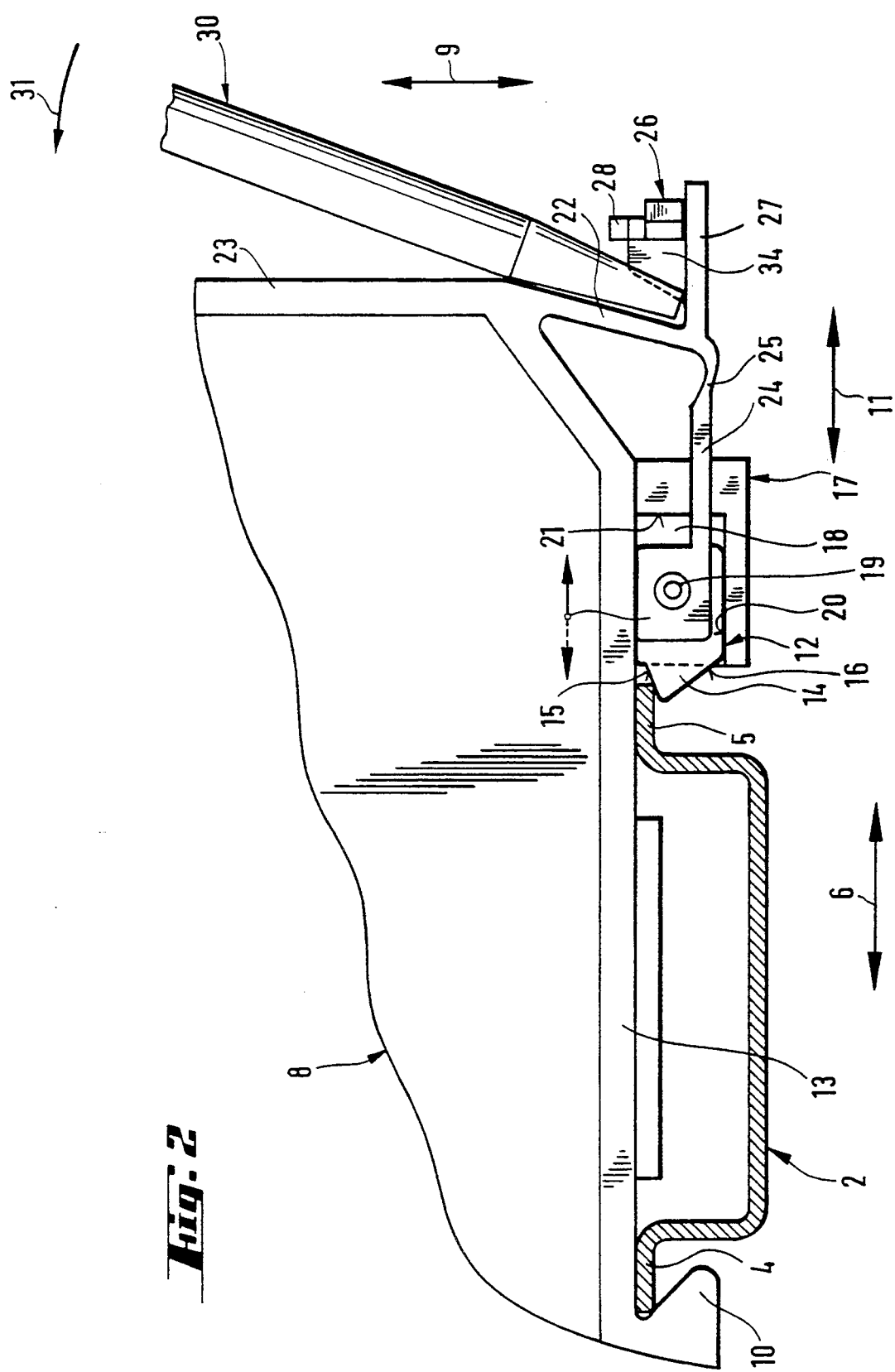
FIG. 2 is a partial side view of a housing shell in its attachment position, with the sliding latch in its locked position.

The assembled instrument housing of installation device 1 is placed onto carrier rail 2 approximately in an attachment direction 9. Housing shell halves 7 and 8 each have a rigid and wedge-shaped detent projection 10 which is shaped onto them in one piece and one of which, detent projection 10 of housing shell half 8, can be seen in FIG. 2. These detent projections engage behind rail angle portions 4 and 5. Disposed oppositely in the transverse direction 6 of the rail, a sliding latch 12, which is displaceable in a locking direction 11 and of which sliding latch 12 of housing shell half 8 is shown in FIG. 2, is shaped in one piece to each one of the two housing shell halves 7 and 8. Locking direction 11 extends parallel to the transverse direction 6 of the rail. Sliding latch 12 engages behind rail angle 5.

FIG. 2 shows that a housing side wall which extends in the transverse direction 6 of the rail, and acts as a housing bottom 13, is seated on rail angles 4 and 5. The surface of detent projection 10 facing housing bottom 13 extends at an acute angle relative to housing bottom 13. This angle initially permits, at the onset of the placement process, the direct contact between detent projection 10 and rail angle 4. Then, housing shell halves 7 and 8 are pivoted about an imaginary pivot axis constituted by the outer edge of rail angle 4 that extends in carrier rail direction 3 until housing bottom 13 is seated on the surface of angle 4 facing it. In this case, sliding latch 12 engages in its locked position (FIG. 2).

A wedge-shaped detent lug 14 is shaped in one piece to sliding latch 12 which has an approximately rectangular outer contour in FIG. 2. In the locked position of sliding latch 12, a fixing wedge leg 15 of detent lug 14 grips behind and fixes the outer edge of rail angle 5 while housing bottom 13 is seated on rail angle 5. In cooperation with detent projection 10, this produces a sufficiently stable attachment of the instrument housing to carrier rail 2. The second wedge leg is approximately twice as long as fixing wedge leg 15. The outer face of the second wedge leg facing carrier rail 2 is effective as a sliding surface 16. During the attachment process, sliding surface 16 slides along the outer edge of rail angle 5, thus moving sliding latch 12 in locking direction 11 opposite to rail angle 5. As soon as the wedge tip of detent lug 14 has reached the outer edge of rail angle 5, fixing wedge leg 15 grips behind the outer edge of housing bottom 13 if the latter continues to pivot in the direction of rail angle 5. Thus sliding latch 12 acts in the manner of a snap fastening.

Sliding latch 12 rests in a guide shell 17 and thus performs a purely translatory movement in locking direction 11. It is shaped in one piece to housing bottom 13. Together with housing bottom 13 it delimits a rectangular guide cavity 18. In the transverse direction 6 of the rail and facing rail angle 5, guide cavity 18 is freely accessible in order for detent lug 15 to project over guide shell 17 when in the locked position. In carrier rail direction 3 and facing housing shell half 7, guide cavity 18 of housing shell half 8 is also freely accessible so that its sliding latch 12, when the instrument housing is assembled, is able to cooperate as a unit, by means of a cylindrical connecting pin 19 extending in carrier rail direction 3, with the sliding latch 12 of housing shell half 7. The face of guide shell 17 facing connecting pin 19 in carrier rail direction 3, housing bottom 13 and the side face of guide shell 17 being disposed opposite thereto in the attachment direction 9 and acting as a holding face 20, each directly touch an outer face of sliding latch 12. However, the friction between contacting faces is so low here that the necessary freedom of longitudinal mobility of sliding latch 12 is ensured. Sliding latch 12 rests on holding face 20 and thus, in its locked position, exerts a constant pressure force on rail angle 5 over the service life of the instrument housing. Opposite detent lug 14, when seen in locking direction 11, the displacement path of sliding latch 12 is limited by a side face of guide shell 17 which acts as a delimiting face 21. Delimiting face 21 lies in a plane defined by attachment direction 9 and carrier rail direction 3.

While sliding latch 12 is rigidly connected with detent lug 14, it is flexibly connected with a flexible web 22 that is shaped in one piece to housing shell half 8.

The rod-like flexible web 22 constitutes an extension of the bottom end of a housing side wall 23 of housing shell half 8 extending in attachment direction 9. Housing side wall 23 and flexible web 22 enclose an obtuse angle. In attachment direction 9, flexible web 22 projects beyond housing bottom 13 and is oriented toward guide shell 17. Flexible web 22 is elastic and thus allows sliding latch 12 to move in locking direction 11.

Sliding latch 12 is connected with flexible web 22 by way of a rod-like connecting web 24 extending approximately in the locking direction 11 of the rail. Flexible web 22 and connecting web 24 also enclose an obtuse angle. In a region 25 near the vertex of the angle formed by flexible web 22 and connecting web 24, the surface of connecting web 24 facing flexible web 22 in attachment direction 9 is given a trough-like recess so that its wall thickness there is weaker. This weakening of the wall thickness in region 25 serves as a predetermined bending location and permits the necessary pivotal mobility between flexible web 22 and connecting web 24. At the movable end of flexible web 22 facing region 25 of weakened wall thickness, an actuating end 26 and a contact web 27 connected thereto and extending in the transverse direction 6 of the rail is shaped on in one piece. In attachment direction 9, contact web 27 and connecting web 24 are oriented approximately at the same height and shaped to the moving end of flexible web 22. Contact web 27 encloses an acute angle with flexible web 22.

Figure 4:
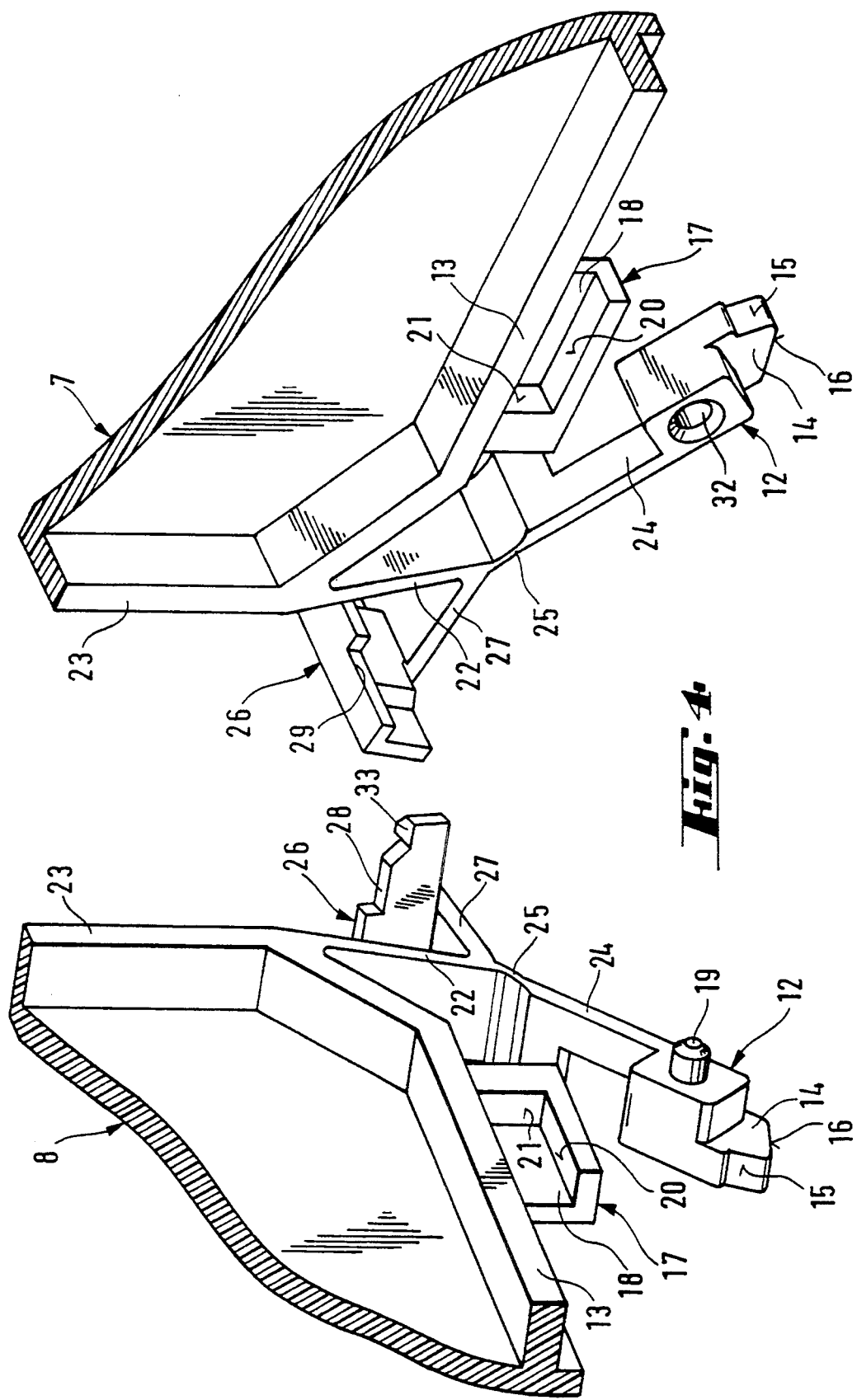
FIG. 4 is a perspective view of the two housing shells to be assembled to form the instrument housing.

Actuating end 26 is preferably made rigid. A detent web 28 extending essentially in attachment direction 9 is shaped to the end region of contact web 27 of housing shell half 8 where it faces the weakened wall thickness 25 in the transverse direction 6 of the rail (FIG. 2). In direction 3 of the carrier rail, detent web 28 projects on one side beyond contact web 27 so as to engage during assembly of housing shell halves 7 and 8 in a detent groove 29 of actuating end 26 of housing shell half 7 and produce a mechanically stable fixing of the two housing shell halves 7 and 8 (FIG. 4).

FIG. 2 shows a releasing operation wherein the blade end of an actuating tool 30 in the form of a screwdriver blade engages in an interior region defined by flexible web 22, contact web 27 and detent web 28. Actuating tool 30 is supported at the housing end of flexible web 22. The housing end of flexible web 22 constitutes a mechanically stable abutment so that actuating tool 30 is fixed in actuating end 26 and can be pivoted in pivoting direction 31 without much expenditure of force. The housing end of flexible web 22 here constitutes the fulcrum of actuating tool 30 which, when pivoted, acts as a two-armed lever.

If actuating tool 30 is pivoted in pivoting direction 31, sliding latch 12 is transferred into its release position in locking direction 11 away from rail angle 5. In this way the snap fastening of instrument housing can be released. The displacement path of sliding latch 12 is limited by a limitation surface 21 and partially also by the limited elasticity of flexible web 22.

Figure 3:
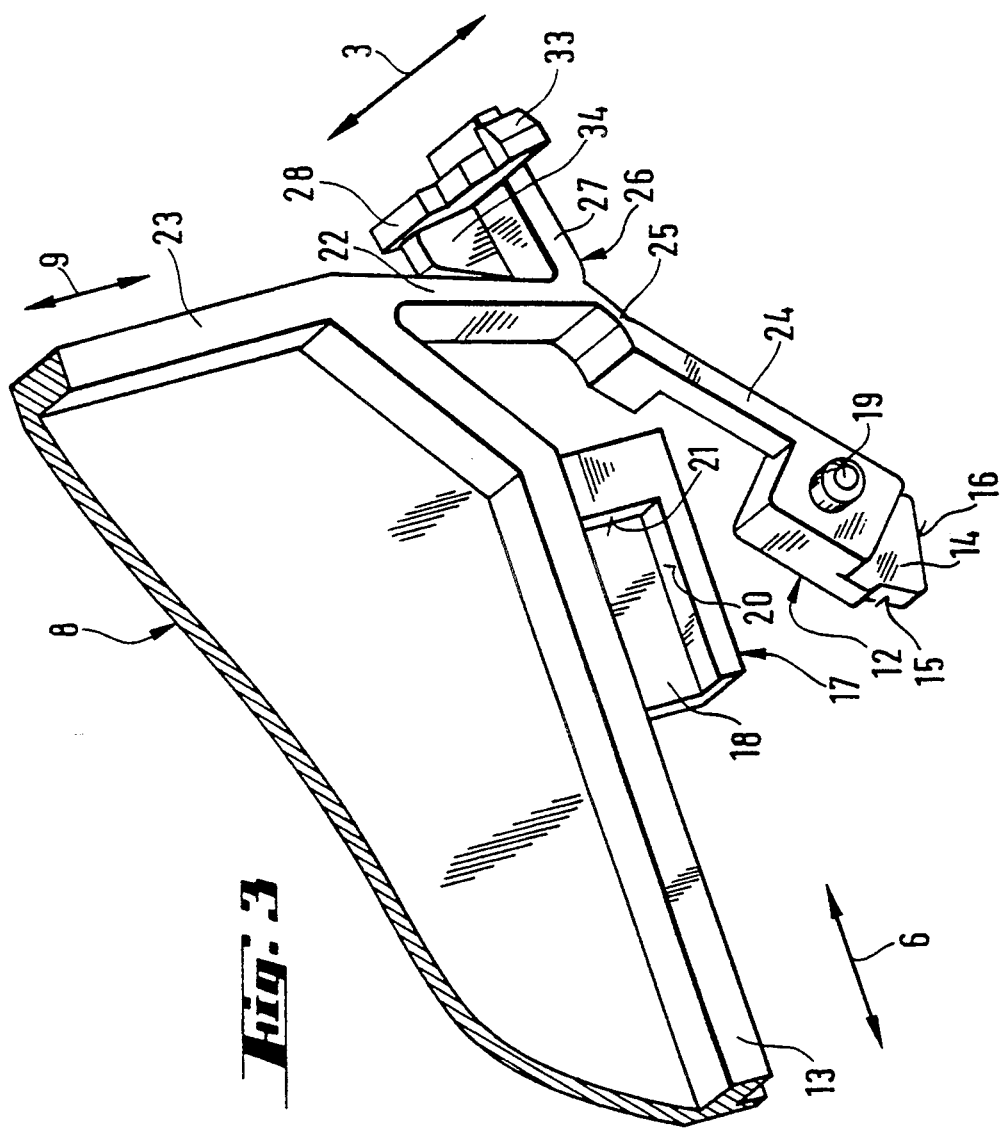
FIG. 3 is a perspective view of a housing shell of the instrument housing.

FIG. 3 shows that all operational components for the snap connection and for its release are shaped in one piece to housing shell half 8. This facilitates their manufacture. The subsequent insertion of sliding latch 12 into the cavity 18 of guide shell 17 is possible without problems since flexible web 22 and, to a limited extent, also connecting web 24 are elastic. In order not to interfere with the displacement movements of sliding latch 12 in the transverse direction 6 of the rail, connecting web 24 is given a rectangular recess in its region facing guide shell 17. The recess follows directly after the end of sliding latch 12 on the Side of the connecting web. In the region 25 of weakened wall thickness, connecting web 24 extends in the direction 3 of the carrier rail to the same extent as weakened wall thickness 25 itself and as flexible web 22. Thus, connecting web 24 is given an L-shaped outer contour. If sliding latch 12 is moved into its locked position, this L-shaped bottom abuts at guide shell 17 and thus acts as an abutment for the locked position.

FIG. 4 shows that each half of sliding latch 12 projects beyond the guide cavity 18 of each half of guide shell 17 in carrier rail direction 3. The projection side of each half of sliding latch 12 is flush with the non-recessed side of connecting web 24. Detent lug 14, however, is offset in carrier rail direction 3 with respect to the surface of the half of sliding latch 12 associated with connecting pin 19 and ends flush with the surface of the half of sliding latch 12 disposed opposite connecting pin 19. Detent lug 14 and the carrier face 20 of guide shell 17 carrying detent lug 14 together with sliding latch 12 extend approximately the same distance in carrier rail direction 3.

FIG. 4 also shows that the two housing shell halves 7 and 8, which can be assembled to form the instrument housing, have identical configurations except for connecting pin 19, a corresponding connecting bore 32 in the sliding latch 12 associated with housing shell half 7 and except for a detent web 28 of housing shell half 8 and a corresponding detent groove 29 in housing shell half 7. This also facilitates the manufacture of the instrument housing.

At its projecting end facing housing shell half 7, detent web 28 is provided with a detent lug 33 which, during the assembly of housing shells halves 7 and 8, produces a latching of detent web 28 and detent groove 29 (FIG. 1). Thus the mechanical stability of actuating end 26 as well as that of the entire instrument housing is improved. The outer edges of detent web 28 and detent groove 29 where they face away from carrier rail direction 3 are each extended in the direction of flexible webs 22 by the length of a web side wall 34. Seen in carrier rail direction 3, the two web side walls 34 are congruent and extend, in attachment direction 9, somewhat lower than detent web 28 and detent groove 29. The structural height of the edge regions of web side walls 34 facing flexible webs 22 decreases continuously in attachment direction 9. Web side walls 34 provide an improved support for actuating tool 30 in carrier rail direction 3. When housing shells halves 7 and 8 are in their assembled state the mutually facing surfaces of the two halves of guide shells 17, sliding latch 12, connecting web 24, flexible web 22 and contact web 27 lie directly against one another and form a two-part, mechanically stable unit. The parting plane of this unit corresponds to the parting plane defined by attachment direction 9 and locking direction 11 of the instrument housing composed of the two housing shell halves 7 and 8.

While a preferred embodiment of the invention has been described and illustrated, it should be recognized that numerous modifications and variations of the disclosed embodiment may be made without departing from the scope of the invention as defined in the appended claims which therefore should not be limited to the details disclosed herein, but rather should be interpreted to embrace any and all equivalent apparatus.

What is claimed is:

1. An electrical installation device for fastening in an attachment position on a carrier rail, a longitudinal extent of the carrier rail defining a carrier rail direction, with the device being moved in an attachment direction toward the carrier rail during fastening, said device comprising:

an instrument housing made of insulating plastic and having an instrument housing wall and a bottom facing the carrier rail in the attachment position;

a-sliding latch shaped in one piece to said instrument housing wall and being movable in a locking direction outside of the housing bottom transversely to the attachment direction and to the carrier rail direction;

a flexible web being spring elastic in the locking direction and connected between said sliding latch and said instrument housing wall;

a detent lug attached to said sliding latch and, in the locking direction, gripping behind the carrier rail;

an actuating end connected to said flexible web and facing away from said detent lug, said sliding latch being returned against a spring elasticity of said flexible web from a locked position into a release position by actuation of said actuating end; and a longitudinal guide attached to said instrument housing wall, wherein said sliding latch is guided in said longitudinal guide between said detent lug and said flexible web.

2. A device as defined in claim 1, wherein
said detent lug is rigidly connected with said sliding latch; and
said sliding latch is flexibly connected with said flexible web.

3. A device as defined in claim 1, wherein the locking direction of said sliding latch forms an approximately right angle with the longitudinal extent of the flexible web, and said device further comprises a connecting web disposed between said sliding latch and said flexible web, said connecting web including a weakened wall thickness section which constitutes a predetermined bending location.

4. A device as defined in claim 3, wherein said connecting web extends approximately in the locking direction of said sliding latch and forms an obtuse angle with said flexible web.

5. A device as defined in claim 1, wherein said instrument housing wall includes a side wall having a bottom end and said flexible web projects from the bottom end of said side wall so as to form an obtuse angle with said side wall.

6. A device as defined in claim 5, wherein said flexible web has an upper end attached to the bottom end of said side wall, a moving end remote from the bottom end of said side wall and a side facing away from said sliding latch, wherein said actuating end is shaped on to said side of the flexible web at the moving end of said flexible web and lies below the upper end of said flexible web.

7. A device as defined in claim 6, wherein an angle vertex is present between said flexible web and said side wall, and said actuating end lies below the angle vertex.

8. A device as defined in claim 1, wherein said instrument housing includes two shell halves having an approximately central parting plane that extends in the attachment direction and in the locking direction, and said longitudinal guide comprises a guide shell having two guide shell halves each shaped to a respective one of the instrument housing shell halves, wherein said guide shell grips around a periphery of said sliding latch on both sides of said sliding latch.

9. A device as defined in claim 8, wherein said guide shell grips substantially completely around said sliding latch in its peripheral direction.

10. A device as defined in claim 8, wherein said guide shell includes a delimiting face at an end of said guide shell facing away from said detent lug in the locking direction, said delimiting face extending in the attachment direction and in the carrier rail direction for limiting a displacement movement of said sliding latch in a direction opposite to its locked position.

11. A device as defined in claim 8, wherein said two guide shell halves of said guide shell have a plane of symmetry defined by the parting plane of said instrument housing.

12. A device as defined in claim 8, wherein said sliding latch, said connecting web, and said flexible web form a unit that is divided in half to form two partial units that have a plane of symmetry defined by the parting plane of said instrument housing.

13. A device as defined in claim 12, the two partial units are each shaped in one piece to a respective one of said two housing shell halves, and said two partial units include shaped-on fixing means for fixing said two partial units together when said instrument housing is assembled.

14. A device as defined in claim 13, wherein said shaped-on fixing means comprises a connecting pin on one of the partial units and a connecting bore on the other of the partial units which has a form locking engagement with said connecting pin.

15. A device as defined in claim 14, wherein one of said instrument housing shell halves has a detent groove and the other of said instrument housing shell halves has a shaped-on detent web which latches with said detent groove when said instrument housing is assembled.

* * * * *